United States Patent
Tamura et al.

[19]

[11] Patent Number: 5,898,578
[45] Date of Patent: Apr. 27, 1999

[54] TRANSFORMER-ISOLATED POWER TRANSFER APPARATUS HAVING INTERMITTENT AND CONTINUOUS OSCILLATION MODES OF OPERATION

[75] Inventors: Hideki Tamura; Mikihiro Yamashita; Yoshiki Katsura, all of Osaka, Japan

[73] Assignee: Matsushita Electric Works, Ltd., Osaka, Japan

[21] Appl. No.: 08/996,511

[22] Filed: Dec. 23, 1997

[30]    Foreign Application Priority Data

Dec. 24, 1996  [JP]  Japan ................................ 8-342837

[51] Int. Cl.⁶ ............................................... H02M 3/335
[52] U.S. Cl. ......................................................... 363/19
[58] Field of Search ......................................... 363/19, 18

[56]            References Cited

U.S. PATENT DOCUMENTS

| | | | |
|---|---|---|---|
| 4,654,771 | 3/1987 | Stasch et al. | 363/19 |
| 4,942,508 | 7/1990 | Nakamura | 363/19 |
| 4,956,761 | 9/1990 | Higashi | 363/19 |

FOREIGN PATENT DOCUMENTS 6-311658   11/1994   Japan .

*Primary Examiner*—Shawn Riley
*Attorney, Agent, or Firm*—Griffin, Butler, Whisenhunt & Szipl, LLP

[57]           ABSTRACT

A transformer-isolated power transfer apparatus included in a power supply body and a device body that are removably coupled together. The power supply body contains a primary winding and a secondary winding for transmitting electrical power. The device body contains an induction winding and a load. When the power supply body and device body are coupled together, the secondary winding in the power supply body is electromagnetically inductively coupled to the induction winding provided in the device body to transfer power from the power supply body to the device body via electromagnetic inductive coupling. The apparatus further includes detection circuitry that detects when the power supply body and the device body are coupled together. The power supply body further contains an oscillation drive circuit that drives the primary winding in the power supply body in an intermittent oscillation mode of operation when the detection circuitry detects that the power supply body is not coupled to the device body, and that drives the primary winding in the power supply body in a continuous oscillation mode of operation when the detection circuitry detects that the power supply body is coupled to the device body. During the intermittent oscillation mode of operation, the oscillation on period is controllably varied in response to variations in an input voltage in a manner such as to maintain an average power transmitted from the power supply body to the device body at a substantially constant level. In this manner, the detection circuitry can reliably detect when the power supply body and the device body are coupled together despite variations in the input voltage.

24 Claims, 2 Drawing Sheets

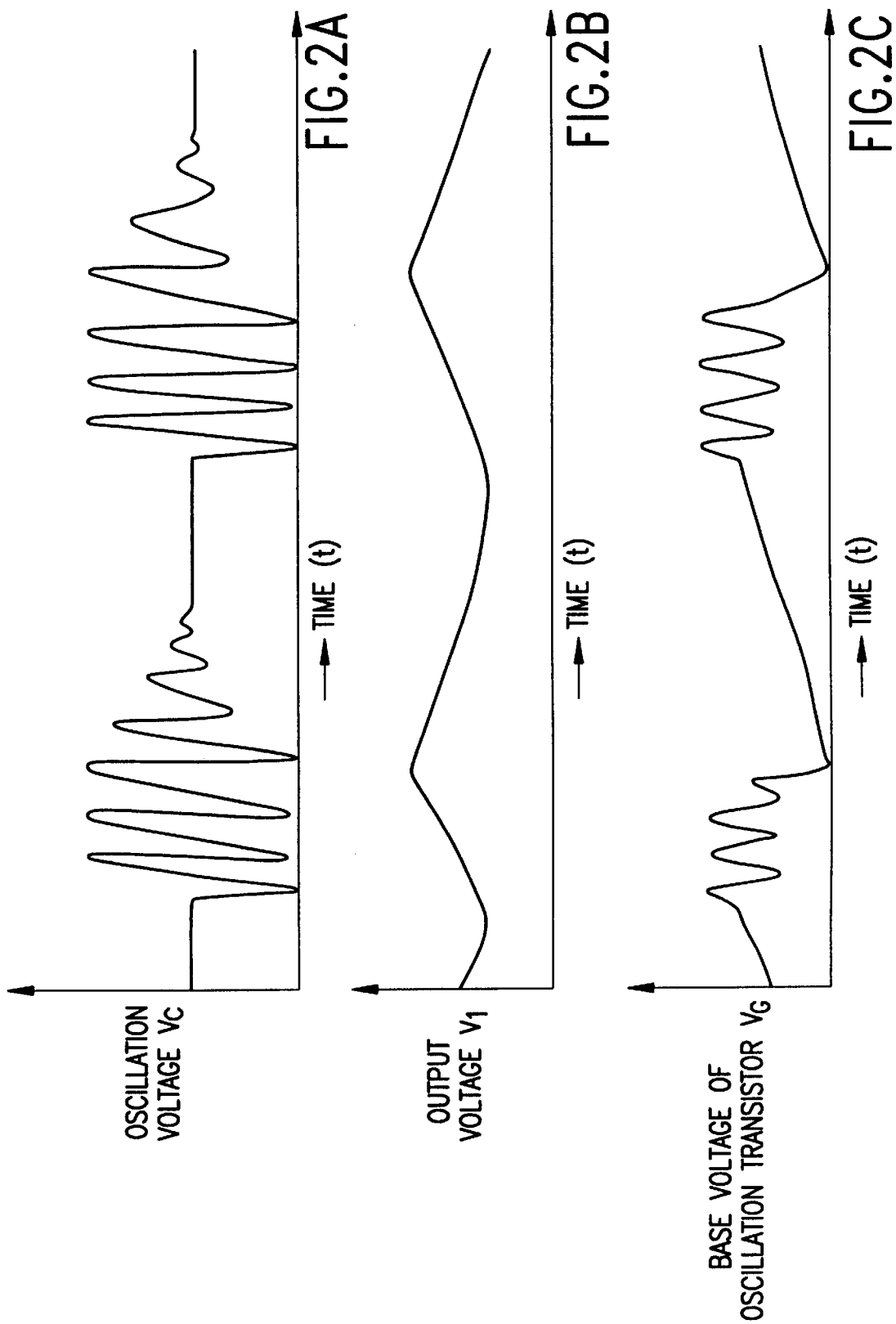

've5,898,578

TRANSFORMER-ISOLATED POWER TRANSFER APPARATUS HAVING INTERMITTENT AND CONTINUOUS OSCILLATION MODES OF OPERATION

FIELD OF THE INVENTION

The present invention relates to a non-contact type power transfer apparatus, suitable for being provided in a charger, an electric toothbrush or other small electric device. Specifically, the invention relates to an apparatus in which an electric device body can be detached from a power supply body that supplies power to the electric device body by means of electromagnetic induction coupling.

BACKGROUND OF THE INVENTION

An example of a conventional non-contact type power transfer apparatus is described in Laid-open patent publication Hei 6-311658. In the apparatus described therein, a signal to detect whether a device body is mounted to a power-supply body is created from a signal output from a primary coil in such a way that the output of a primary side oscillation circuit is sufficiently suppressed.

The above-mentioned conventional non-contact type power transfer apparatus uses a timer as an intermittent drive/oscillation means to set the intermittent time for oscillation. Such a timer, however, requires a timer IC, which increases the cost of the parts significantly. Moreover, such a conventional apparatus provides a constant oscillation duration irrespective of fluctuations in the input voltage. Thus, if only a low voltage is applied due to power-supply conditions, for example, the detection signal level for the device body will be low, while if only a high voltage is applied, this signal level will be high. Thus, the operation of the conventional apparatus is unstable.

SUMMARY OF THE INVENTION

In order to solve the above problems, the present invention provides an inexpensive, stable intermittent drive/oscillation means.

In accordance with the above objects, a non-contact type power transfer apparatus according to the present invention intermittently oscillates and drives a primary winding $T_1$. The primary winding $T_1$ serves as an oscillation winding and sends out a drive signal, functioning as a device detection signal, to the device body B. A response signal from a response-signal circuit Y of the device body B is received by a response-signal reception circuit of a power-supply body A. In the non-contact type power transfer apparatus which detects the device body B, an intermittent drive means M comprises a secondary winding $T_2$ wound around the same core as the primary winding $T_1$, a diode $D_1$ which rectifies a voltage induced on the side of the secondary winding $T_2$ which serves as an induction winding, and a capacitor $C_2$ which smoothes the voltage. A control transistor $Q_2$, which is turned on and off by the output voltage of the intermittent drive means M, is connected to the control terminal of an oscillation transistor $Q_1$, to oscillate transistor $Q_1$.

Further objects, features and advantages of the present invention will become apparent from the Detailed Description of the Preferred Embodiment, which follows, when considered together with the attached Figures.

BRIEF DESCRIPTION OF THE DRAWINGS

In the Drawings:

FIG. 2 shows waveforms of the non-contact type power transfer apparatus. FIGS. 2A, 2B, and 2C respectively illustrate changes in the oscillation voltage $V_C$, output voltage $V_1$ of the oscillation winding $T_1$, and the base voltage $V_G$ of the oscillation transistor $Q_1$, all relative to time t.

DETAILED DESCRIPTION OF THE PREFERRED EMBODIMENT

Figure 1:
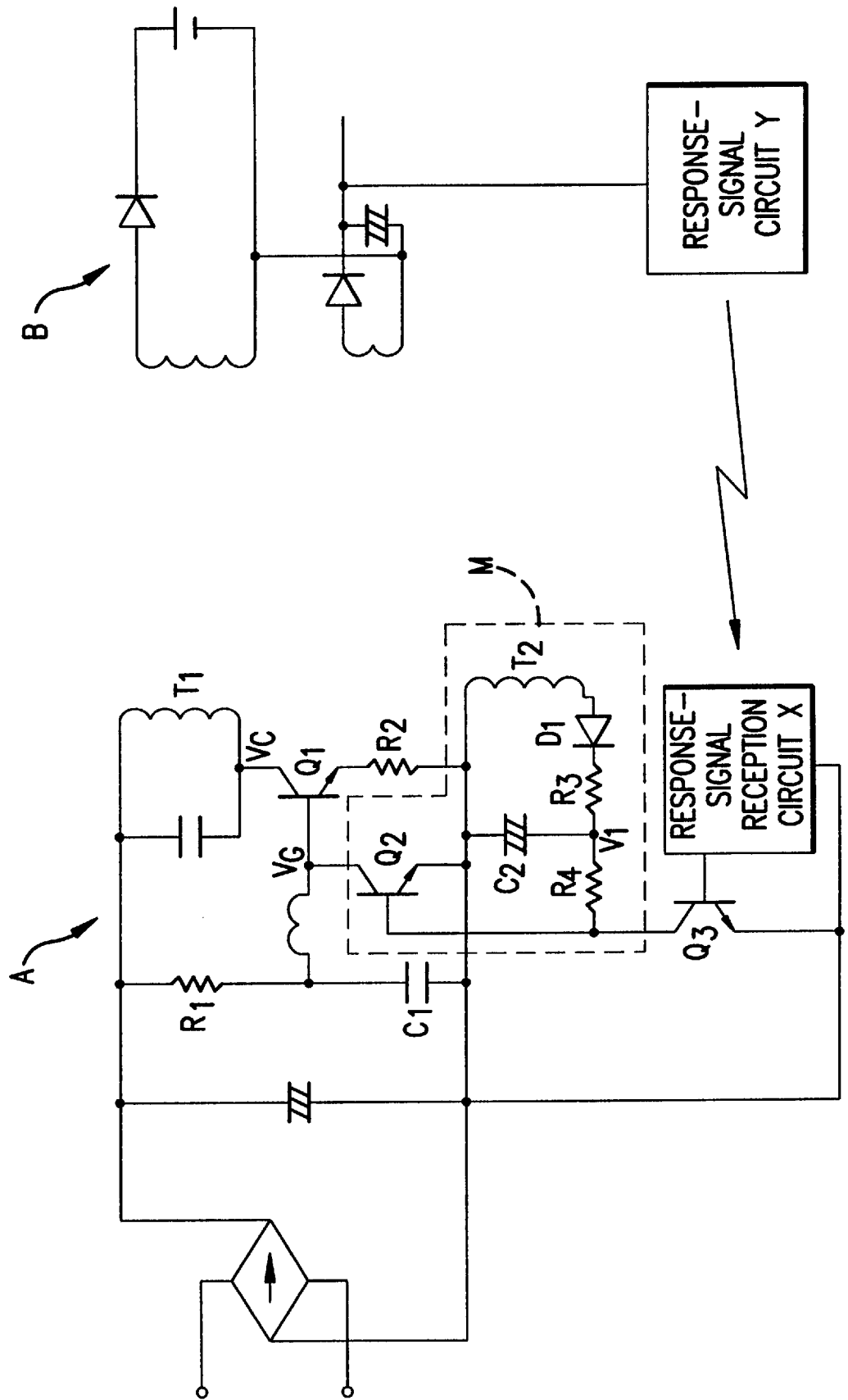
FIG. 1 is an electric circuit diagram of the non-contact type power transfer apparatus according to the present invention.

The operation of a non-contact type power transfer apparatus according to a preferred embodiment of the present invention will be described as follows.

First, an output of the secondary winding $T_2$ induced by the primary winding $T_1$ is rectified by diode $D_1$ and then smoothed by a capacitor $C_2$, to thereby produce an output voltage $V_1$ at a node intermediate resistors R3 and R4. When the output voltage $V_1$ reaches a prescribed threshold value, the control transistor $Q_2$ is turned on to thereby stop oscillation. When oscillation stops, no voltage is induced by the secondary winding $T_2$, so that the output voltage $V_1$ gradually decreases and turns off the control transistor $Q_2$ when the output voltage falls below the prescribed threshold value.

When the control transistor $Q_2$ is turned off, an electric charge is accumulated in the capacitor $C_1$ via a resistor $R_1$ and thus increases the base voltage $V_G$ of the oscillation transistor $Q_1$, which is then turned on to start oscillation. Subsequently, this operation is repeated to provide intermittent oscillation driving.

When a device body B is mounted on a power-supply body A, an intermittently driven signal induces a voltage in the device body B. A response-signal circuit Y of device body B in turn outputs a response signal. When an output signal of the response-signal circuit Y is received by a response-signal reception circuit X of the power-supply body A, a transistor $Q_3$ is turned on and the control transistor $Q_2$ is turned off, so as to provide continuous oscillation. The resistor $R_3$ restricts the amount of charge accumulated in the capacitor $C_2$ and to delay the rise in output voltage VI, thus controlling the duration of the intermittently driven oscillation.

If the input voltage is low, the voltage induced on the side of the secondary winding $T_2$ is also low, the output voltage $V_1$ increases slowly, and the duration of the intermittently driven oscillation increases. If the input voltage is high, on the other hand, the duration of the intermittently driven oscillation becomes shorter, thus sending out a constant amount of signal as a detection signal.

The preferred embodiment of a non-contact type power transfer apparatus according to the present invention is now described with reference to the drawings.

FIG. 1 is an electric circuit diagram of the non-contact type power transfer apparatus according to the present invention. Reference numeral A designates a power-supply body, B designates a device body, $T_1$ designates a primary winding (hereinafter referred to as an oscillation winding), $T_2$ designates a secondary winding (hereinafter referred to as the induction winding) wound around the same core (not shown) as the primary winding, $C_1$ and $C_2$ designate capacitors, $D_1$ designates a diode, $Q_1$ designates an oscillation transistor, $Q_3$ designates a transistor connected to the base of the control transistor $Q_2$, $R_1$, $R_2$, $R_3$ and $R_4$ designate resistors, $V_G$ designates a base voltage of the oscillation transistor $Q_1$, X designates a response-signal reception circuit, and Y designates a response-signal circuit.

The non-contact type power transfer apparatus according to the present invention operates as follows. The basic operations for oscillation in the electric circuit shown in FIG. 1 are not described here, because they would be understood by one of ordinary skill in the art familiar with conventional circuits of this type. For performing intermittent driving, the induction winding $T_2$ is wound around the same core (not shown) as the oscillation winding $T_1$. The output of the induction winding $T_2$ is rectified by the diode $D_1$ and smoothed by the capacitor $C_2$. When the output voltage $V_1$ reaches a prescribed value, the control transistor $Q_2$ is turned on to stop oscillation. When oscillation stops, no voltage is induced by the induction winding $T_2$, so that the output voltage $V_1$ decreases gradually and turns off the control transistor $Q_2$.

When the control transistor $Q_2$ is turned off, charge is accumulated on the capacitor $C_1$ via a resistor $R_1$ and the base voltage of an oscillation transistor $Q_1$ increases and turns on the oscillation transistor $Q_1$ to start oscillation. Subsequently, this operation is repeated, so as to provide intermittent oscillation driving.

When device body B is mounted onto power-supply body A, an intermittently driven signal induces a voltage in device body B. The response-signal circuit Y of device body B in turn emits a response signal. When an output of the response-signal circuit Y is received by the response-signal reception circuit X, the transistor $Q_3$ is turned on and the control transistor $Q_2$ is turned off, so as to provide continuous oscillation. A resistor $R_3$ is provided to restrict the amount of charge accumulated in capacitor $C_2$ so as to delay a rise in output voltage $V_1$, thus controlling the duration of the intermittently driven oscillation. If the input voltage is low, the voltage induced by induction winding $T_2$ is also low, so that the output voltage $V_1$ increases slowly, thus increasing the duration of the intermittently driven oscillation. If the input voltage is high, on the other hand, the duration of the intermittently driven oscillation is short, thereby sending out a constant amount of signal as a detection signal.

FIG. 2 shows waveforms of the non-contact type power transfer apparatus. FIGS. 2A, 2B, and 2C respectively illustrate changes in the oscillation voltage $V_C$, output voltage $V_1$ of the oscillation winding $T_1$ and the base voltage $V_G$ of the oscillation transistor $Q_1$, relative to time t.

As stated above, a non-contact type power transfer apparatus according to the present invention intermittently oscillates and drives the oscillation winding $T_1$, the driven signal of which is given as a device detection signal to the device body B, while the power-supply A receives a response signal from the device body B, to detect the device body B. An intermittent drive means M comprises an induction winding $T_2$ wound around the same core as the oscillation winding $T_1$, a diode $D_1$ which rectifies the voltage induced on the side of the induction winding $T_2$, and a capacitor $C_2$ which smoothes the voltage. A control transistor $Q_2$, which operates on the output voltage $V_1$ of the intermittent drive means M, is connected to the control terminal of an oscillation transistor $Q_1$, to drive the oscillation transistor $Q_1$ intermittently with an oscillation voltage $V_C$. Thus, stable and intermittent driving is assured.

According to a non-contact type power transfer apparatus of the present invention, a very simple circuit configuration can provide stable and intermittent driving. Also, a constant amount of signal can be sent out as a detection signal, effectively independently of the input voltage.

While the present invention has been described in terms of a preferred embodiment, one of ordinary skill in the art will recognize that modifications, improvements, additions and deletions can be made while remaining within the scope and spirit of the present invention. The scope of the invention is determined solely by the appended claims.

The reference numerals referred to in the specification and drawings are as follows:

| | |
|---|---|
| $T_1$ | Primary winding (oscillation winding) |
| $T_2$ | Secondary winding (induction winding) |
| $Q_1$ | Oscillation transistor |
| $Q_2$ | Control transistor |
| $Q_3$ | Transistor connected to base of transistor $Q_1$ |
| $R_1$ | Resistor |
| $R_2$ | Resistor |
| $R_3$ | Resistor |
| $R_4$ | Resistor |
| $D_1$ | Diode |
| $C_1$ | Capacitor |
| $C_2$ | Capacitor |
| $V_1$ | Output voltage |
| $V_C$ | Oscillation voltage |
| $V_G$ | base voltage of oscillation transistor $Q_1$ |
| M | Intermittent drive means |
| A | Power-supply body |
| B | Device body |
| X | Response-signal reception circuit |
| Y | Response-signal circuit |

What is claimed is:

1. A transformer-isolated power transfer apparatus, comprising:
   a primary winding wound around a core;
   a first transistor coupled between an oscillation drive circuit and the primary winding, the first transistor having a control electrode;
   a secondary winding wound around the core, wherein the primary winding is driven in oscillation in response to the first transistor being turned on, to thereby induce the secondary winding to produce an output voltage;
   a rectifier coupled to the output voltage for rectifying the output voltage, to thereby produce a rectified output voltage;
   a time delay circuit coupled to the rectified output voltage for producing an oscillation control voltage after a variable time delay period which is inversely proportional to the magnitude of the rectified output voltage;
   a second transistor coupled between the control electrode of the first transistor and the secondary winding, the second transistor having a control electrode coupled to the oscillation control voltage, wherein the second transistor is turned on when the oscillation control voltage reaches a prescribed threshold value, and is turned off when the oscillation control voltage falls below the prescribed threshold value;
   wherein the first transistor is turned on in response to the second transistor being turned off, and the first transistor is turned off in response to the second transistor being turned on, whereby the primary winding is driven in oscillation intermittently at intervals having a duration inversely proportional to the magnitude of the output voltage.

2. The transformer-isolated power transfer apparatus as set forth in claim 1, wherein the primary winding, the secondary winding, the rectifier, the time delay circuit, and the first and second transistors are contained within a power supply body.

3. The transformer-isolated power transfer apparatus as set forth in claim 2, further comprising a device body coupled to the power supply body.

4. The transformer-isolated power transfer apparatus as set forth in claim 3, wherein power produced by the primary winding is transferred to a device body.

5. The transformer-isolated power transfer apparatus as set forth in claim 4, wherein the average power produced by the primary winding is substantially constant, regardless of variations in the magnitude of an input voltage applied to the power supply body.

6. The transformer-isolated power transfer apparatus as set forth in claim 3, wherein the primary winding produces an intermittent detection signal.

7. The transformer-isolated power transfer apparatus as set forth in claim 6, wherein:
the device body includes a signal detection circuit which produces a response signal responsive to detection of the intermittent detection signal;
the power supply body includes a response signal reception circuit which receives the response signal produced by the device body, and in response thereto produces a power supply control signal;
the power supply body further includes a third transistor connected between the control electrode of the second transistor and a reference node, the third transistor having a control electrode coupled to the power supply control signal; and,
wherein the third transistor is turned on in response to the power supply control signal, and the second transistor is turned off in response to the third transistor being turned on, whereby the first transistor is turned on, to thereby drive the primary winding in oscillation.

8. The transformer-isolated power transfer apparatus as set forth in claim 6, wherein:
the device body includes a signal detection circuit which produces a response signal responsive to detection of the intermittent detection signal;
the power supply body includes a response signal reception circuit which receives the response signal produced by the device body, and in response thereto produces a power supply control signal;
the power supply body further includes a third transistor connected between the control electrode of the second transistor and a reference node, the third transistor having a control electrode coupled to the power supply control signal; and
wherein the third transistor is turned on in response to the power supply control signal, and the second transistor is turned off in response to the third transistor being turned on, whereby the first transistor is turned on, to thereby drive the primary winding in continuous oscillation.

9. The transformer-isolated power transfer apparatus as set forth in claim 7, wherein the intermittent detection signal has a substantially constant average power, whereby a voltage level induced in the signal detection circuit is substantially constant, to thereby enable reliable detection of the intermittent detection signal using a fixed threshold voltage value, regardless of variations in the magnitude of an input voltage applied to the power supply body.

10. The transformer-isolated power transfer apparatus as set forth in claim 8, wherein the intermittent detection signal has a substantially constant average power, whereby a voltage level induced in the signal detection circuit is substantially constant, to thereby enable reliable detection of the intermittent detection signal using a fixed threshold voltage value, regardless of variations in the magnitude of an input voltage applied to the power supply body.

11. The transformer-isolated power transfer apparatus as set forth in claim 1, wherein the time delay circuit comprises an RC circuit.

12. A transformer-isolated power transfer apparatus, comprising:
an oscillation circuit having an oscillation on mode for producing an electromagnetic signal, and an oscillation off mode;
an intermittent drive circuit coupled to the oscillation circuit for receiving the electromagnetic signal and for generating a first control signal having a first logic level which has a duration which is inversely proportional to a magnitude of the electromagnetic signal, and a second logic level; and,
a control device responsive to the first control signal for placing the oscillation circuit in the oscillation on mode in response to the first control signal having the first logic level, and for placing the oscillation circuit in the oscillation off mode in response to the first control signal having the second logic level.

13. The transformer-isolated power transfer apparatus as set forth in claim 12, further comprising a power supply body for housing the oscillation circuit, the intermittent drive circuit, and the control device.

14. The transformer-isolated power transfer apparatus as set forth in claim 13, wherein the oscillation circuit produces an intermittent detection signal at intervals corresponding to the oscillation on mode, and further comprising a device body which includes a signal detection circuit which produces a response signal responsive to detection of the intermittent detection signal.

15. The transformer-isolated power transfer apparatus as set forth in claim 14, further comprising:
a response signal detection circuit which receives the response signal produced by the device body, and in response thereto produces a second control signal; and,
wherein the control device is responsive to the second control signal for placing the oscillation circuit in a continuous oscillation mode.

16. A transformer-isolated power transfer apparatus, comprising:
oscillation means having an oscillation on mode for producing an electromagnetic signal, and an oscillation off mode;
intermittent drive means coupled to the oscillation means for receiving the electromagnetic signal and for generating a control signal having a first logic level which has a duration which is inversely proportional to a magnitude of the electromagnetic signal, and a second logic level; and, control means responsive to the control signal for placing the oscillation means in the oscillation on mode in response to the first control signal having the first logic level, and for placing the oscillation means in the oscillation off mode in response to the control signal having the second logic level.

17. A transformer-isolated power transfer apparatus included in a power supply body and a device body that are removably coupled together, wherein the power transfer apparatus includes:
an electromagnetic power supply means contained in the power supply body;
an induction winding and load contained in the device body, wherein when the power supply body and the device body are coupled together, the electromagnetic power supply means in the power supply body is electromagnetically inductively coupled to the induction winding in the device body to transfer power from the power supply body to the device body via electromagnetic inductive coupling;

detection circuitry for detecting when the power supply body and the device body are coupled together;

an oscillation drive circuit that drives the electromagnetic power supply means in a continuous oscillation mode of operation in response to the detection circuitry detecting that the power supply body and the device body are coupled together, and that drives the electromagnetic power supply means in an intermittent oscillation mode of operation when the power supply body and the device body are not coupled together; and, wherein, in the intermittent oscillation mode of operation, the oscillation drive circuit controllably varies an oscillation on period in response to variations in an input voltage in a manner such as to maintain an average level of the power transmitted from the power supply body to the device body at a substantially constant level.

18. The power transfer apparatus as set forth in claim 17, wherein the electromagnetic power supply means includes a primary winding and the oscillation drive circuit includes a secondary winding.

19. The power transfer apparatus as set forth in claim 17, wherein the detection circuitry includes:

a response signal generating circuit contained in the device body for generating a response signal upon detecting a threshold value of the power transmitted by the electromagnetic power supply means when the power supply body and the device body are coupled together;

a response signal receiving circuit contained in the power supply body for receiving the response signal generated by the response signal generating circuit and for generating an oscillation mode switching signal in response to receiving the response signal; and, wherein the oscillation drive circuit is responsive to the oscillation mode switching signal to change the oscillation mode of operation from the intermittent oscillation mode of operation to the continuous oscillation mode of operation.

20. A transformer-isolated power transfer apparatus according to claim 17, wherein the oscillation drive circuit includes:

a control transistor coupled to the electromagnetic power supply means for controlling the oscillation on period during the intermittent oscillation mode of operation;

a capacitor that is coupled to the control transistor and that is charged to a predetermined voltage level during a predetermined period of oscillation; and, wherein the control transistor is turned on in response to the capacitor being charged to the predetermined voltage level, and is turned off during the predetermined period of oscillation.

21. The power transfer apparatus as set forth in claim 19, wherein the oscillation drive circuit includes:

a control transistor coupled to the electromagnetic power supply means for controlling the oscillation on period during the intermittent oscillation mode of operation;

a capacitor that is coupled to the control transistor and that is charged to a predetermined voltage level during a predetermined period of oscillation; and, wherein the control transistor is turned on in response to the capacitor being charged to the predetermined voltage level, and is turned off during the predetermined period of oscillation.

22. The power transfer apparatus as set forth in claim 19, further including a switching transistor coupled to the control transistor, wherein the switching transistor turns off the control transistor to terminate the intermittent oscillation mode of operation in response to the oscillation mode switching signal.

23. The power transfer apparatus as set forth in claim 21, further including a switching transistor coupled to the control transistor, wherein the switching transistor turns off the control transistor to terminate the intermittent oscillation mode of operation in response to the oscillation mode switching signal.

24. A transformer-isolated power transfer apparatus included in a power supply body and a device body that are removably coupled together, wherein the power transfer apparatus includes:

an electromagnetic power supply means contained in the power supply body;

an induction winding and load contained in the device body, wherein when the power supply body and the device body are coupled together, the electromagnetic power supply means in the power supply body is electromagnetically inductively coupled to the induction winding in the device body to transfer power from the power supply body to the device body via electromagnetic inductive coupling;

detection circuitry for detecting when the power supply body and the device body are coupled together;

an oscillation drive circuit that drives the electromagnetic power supply means in a continuous oscillation mode of operation in response to the detection circuitry detecting that the power supply body and the device body are coupled together, and that drives the electromagnetic power supply means in an intermittent oscillation mode of operation when the power supply body and the device body are not coupled together; and, wherein the oscillation drive circuit includes:

a control transistor coupled to the electromagnetic power supply means for controlling the oscillation on period during the intermittent oscillation mode of operation;

a capacitor that is coupled to the control transistor and that is charged to a predetermined voltage level during a predetermined period of oscillation; and, wherein the control transistor is turned on in response to the capacitor being charged to the predetermined voltage level, and is turned off during the predetermined period of oscillation.

* * * * *